Patented June 22, 1948

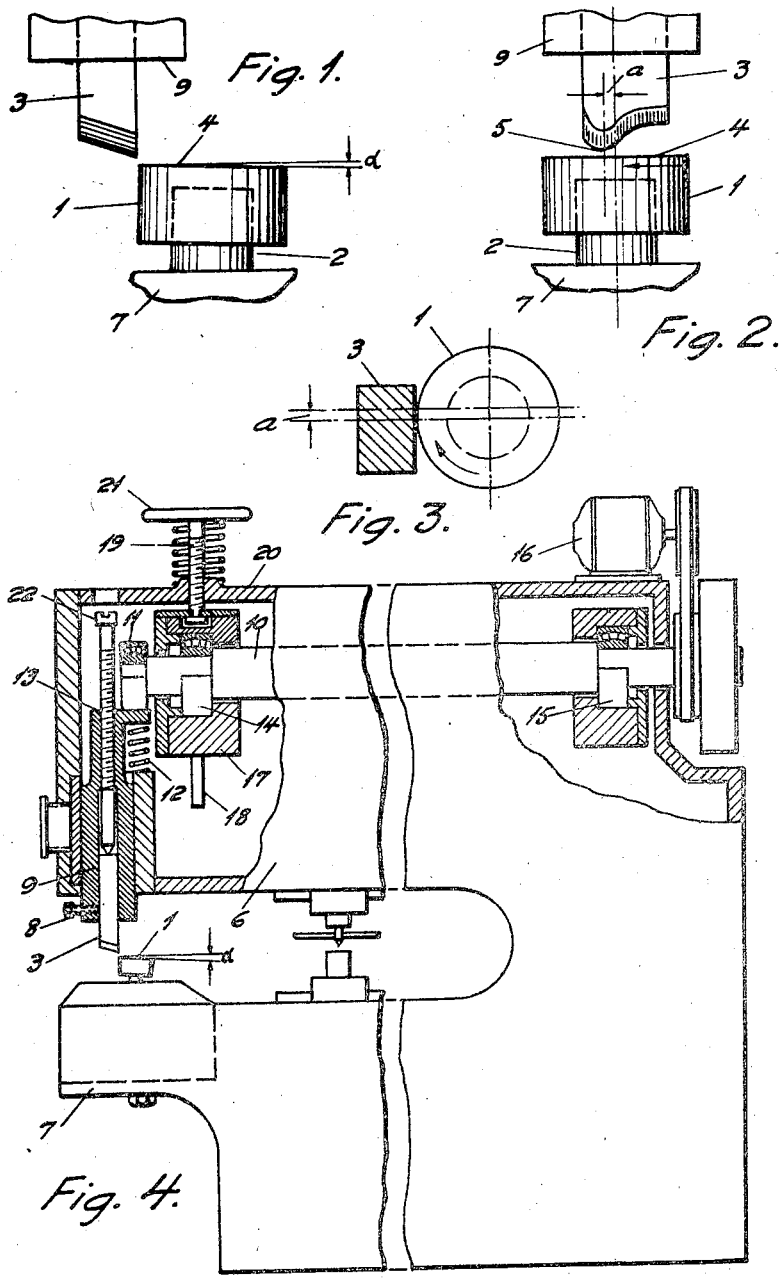

2,443,764

UNITED STATES PATENT OFFICE 2,443,764

PLATE SHEARING MACHINE

Gunnar Johan Emanuel Ekberg and Ove Leonard Ekberg, Ornskoldsvik, Sweden, assignors to Aktiebolaget Fr. Ramstrom, Stockholm, Sweden, a corporation of Sweden Application December 21, 1945, Serial No. 636,410
In Sweden January 29, 1945

6 Claims. (Cl. 164—47)

This invention relates to sheet metal shearing machines.

One object of this invention is to provide a machine of the character described in which the cooperating shearing members are constructed and arranged in a new and advantageous manner.

A further object of this invention is to provide a new driving and adjusting mechanism for the reciprocating shearing member of such a machine whereby the mean distance between this shearing member and the stationary shearing member cooperating therewith may be adjusted during the operation of the machine.

Other objects of this invention will be apparent from the disclosures in the specification and the accompanying drawing.

In the drawing which illustrates a preferred form of the machine:

Fig. 1 is a side elevational view of two cooperating shearing members constructed and arranged according to this invention;

Fig. 2 is a similar view looking from the left hand side of Fig. 1;

Fig. 3 is a top plan view corresponding to Fig. 1, one of the shearing members being shown in horizontal cross section, and Fig. 4 is a side elevational view of a preferred form of shearing machine, some parts being broken away and others being shown in vertical cross section to illustrate the driving and adjusting mechanism for the reciprocating shearing member.

As will appear from Fig. 4 the machine frame is provided with upper and lower projecting parts 6 and 7, respectively, between which a gap is formed. The stationary shearing member carried by the lower projecting part 7 consists of a freely rotatable and non-reciprocating roll 1 having a circular cutting edge while the other shearing member 3 is in the form of a blade which is connected to a slide 9 by means of a set screw 8, the slide being mounted for vertical reciprocating movement in the upper projecting part 6 of the machine frame. The slide 9 is adapted to be actuated by an eccentric mounted on one end of a horizontal driving shaft 10, said eccentric being in the form of a spherical roller bearing 11 the outer race of which engages the upper surface 13 of the slide 9, one or more springs 12 being provided for holding this surface of the slide in contact with said race. The shaft 10 is supported in spherical roller bearings 14 and 15, respectively, at both of its ends and is driven from a motor 16 by means of a belt and a pulley. The roller bearing 15 which is nearest to the motor 16 is stationary whereas the other roller bearing 14 is mounted in a housing 17 which is vertically slidable on a pair of oppositely located guides 18 provided on the inner walls of the machine frame. The housing 17 is rotatably connected to screw 19 which extends through a threaded hole in the upper wall 20 of the machine frame and is provided with a handwheel 21 at its outer end. By turning this handwheel the housing 17 may be moved up and down while the shaft 10 rotates, and thus the distance between the blade 3 and the freely rotatable roll 1 may be adjusted until during the reciprocating movement of the blade this cuts through the plate to be sheared. A screw 22 serves for vertical adjustment of the blade 3 in its slide 9.

The member 1 could, if desired, be fixed during cutting but rotatable after cutting to present a fresh cutting surface.

The arrangement of the shearing members is more clearly illustrated in Figs. 1 to 3. The lower, or non-reciprocating, shearing member consists of a roll 1 which is rotatably mounted on a pin 2. The upper, or reciprocating, shearing member consists of a blade 3 the cutting edge of which is provided with a projecting bow-shaped portion 5 (Fig. 2). The roll 1 may be of cylindrical shape, but preferably it is made slightly conical with the base of the cone turned upwards (Fig. 4). As shown in Figs. 1 and 4 the pin carrying the roll 1 forms a small angle $a$ with the direction of movement of the reciprocating blade 3, this angle amounting for instance to 2-3°. The conicity of the roll should at least be equal to the inclination of the roll axis so that the roll does not interfere with the blade at the reciprocating movement of the latter.

The upper shearing blade is arranged in such a manner that when lowering the same towards the roll the most projecting part 5 of its cutting edge intersects the plane through the circular cutting edge of the roll 1 at a point which is located at the side of a line drawn through the axis of the roll 1 perpendicularly towards the inner surface of the blade 3 as indicated by the distance $a$, Figs. 2 and 3. This initial point of intersection should lie after the said line as counted in the direction of feed of the plate to be sheared. With this arrangement of the cooperating shearing members forces will arise during the shearing operation which assist in feeding the plate through the mouth of the machine thus facilitating the work of feeding. Simultaneously the roll 1 is automatically rotated during the shearing operation so that the entire circular cutting edge of the same will be evenly utilized and the durability of this shearing member increased. With the machine described curves having a very small radius of curvature may be sheared and the risk of jamming the plate is entirely eliminated.

The invention should not be regarded as limited to the particular embodiment thereof which has been described above, it being obvious that the details may be varied in different ways within the scope of the appended claims.

What we claim is:

1. In a plate shearing machine, two cooperating shearing members, one consisting of a freely rotatable and non-reciprocating roll having a circular cutting edge and the other being in the shape of a blade mounted for reciprocating movement adjacent the circular cutting edge of said roll in a direction which is substantially perpendicular to a plane through said circular cutting edge.

2. In a plate shearing machine, two cooperating shearing members one of which consists of a freely rotatable and non-reciprocating roll having a circular cutting edge whereas the other is in the shape of a blade mounted for reciprocating movement adjacent the cutting edge of said roll in a direction which is substantially parallel to the axis of the roll, the blade being provided with a cutting edge of such a shape that when approaching the blade towards the roll the initial point of intersection between said blade edge and a plane through the circular cutting edge of the roll is located at the side of a line drawn through the axis of the roll perpendicularly towards said blade.

3. In a plate shearing machine, two cooperating shearing members one of which consists of a freely rotatable and non-reciprocating roll having a circular cutting edge whereas the other is in the shape of a blade mounted for reciprocating movement adjacent the cutting edge of said roll, the axis of the roll being slightly inclined with respect to the direction of movement of said blade.

4. In a plate shearing machine, two cooperating shearing members one of which consists of a rotatably mounted roll having a circular cutting edge whereas the other is in the shape of a blade mounted for reciprocating movement adjacent the cutting edge of said roll, the axis of the roll being slightly inclined with respect to the direction of movement of said blade and the roll being slightly conical with the base of the cone turned towards said blade.

5. In a plate shearing machine, a frame provided with upper and lower projecting parts between which a gap is formed, a shearing member in the form of a freely rotatable roll having a circular cutting edge carried by the lower of said projecting parts, a slide mounted for reciprocating vertical movement in the upper of said projecting parts, a shearing member in the form of a blade connected to said slide and adapted to cooperate with said roll, a driving shaft, an eccentric mounted on one end of said shaft and adapted at the rotation thereof intermittently to move the slide downwards, springs acting on said slide to return the same upwards after each depression by the eccentric, and means for tilting the driving shaft in order to adjust the mean position of said blade with respect to said roll during the reciprocating movement of the former, said driving shaft being supported in spherical bearings at both ends of which the bearing which is nearest to the slide actuating eccentric being mounted for vertical adjusting movement and adapted to be moved by means of a screw and a hand-wheel.

6. In a plate shearing machine, two cooperating and relatively movable shearing members one of which consists of a freely rotatable member having a cutting edge and having an axis which is slightly inclined with respect to the movement of the movable shearing member.

GUNNAR JOHAN EMANUEL EKBERG.
OVE LEONARD EKBERG.

REFERENCES CITED

The following references are of record in the file of this patent:

UNITED STATES PATENTS

| Number | Name | Date |
| --- | --- | --- |
| 1,274,196 | Reed | July 30, 1918 |
| 1,382,642 | Huestis | June 28, 1921 |
| 1,795,303 | Gray | Mar. 10, 1931 |
| 1,922,846 | Gray | Aug. 15, 1933 |
| 1,933,583 | Boulton | Nov. 7, 1933 |
| 2,217,393 | Webb | Oct. 8, 1940 |
| 2,242,782 | Gray | May 20, 1941 |